G. P. EUSTIS.
COMBINED WHEEL AND AXLE.
APPLICATION FILED OCT. 4, 1910.
990,038.
Patented Apr. 18, 1911.
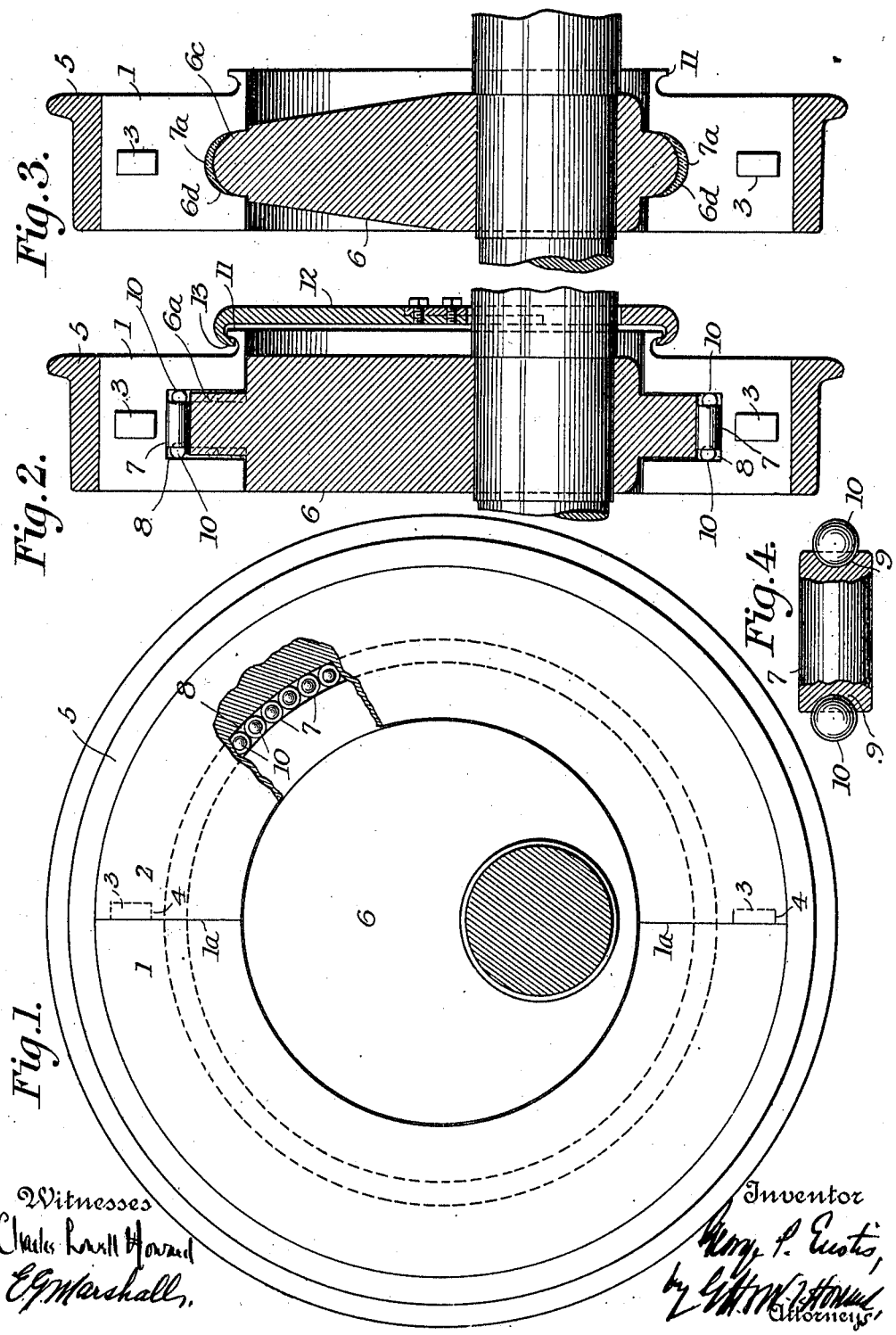

UNITED STATES PATENT OFFICE.

GEORGE P. EUSTIS, OF WASHINGTON, DISTRICT OF COLUMBIA.

COMBINED WHEEL AND AXLE.

990,038.  Specification of Letters Patent.  Patented Apr. 18, 1911.

Application filed October 4, 1910. Serial No. 585,345.

*To all whom it may concern:*

Be it known that I, GEORGE P. EUSTIS, a citizen of the United States, residing at Washington, in the District of Columbia, have invented a new and useful Improvement in Combined Wheels and Axles, of which the following is a specification.

Broadly considered, my invention relates to an improved wheel and axle—preferably for railroad use—in which the axle is, relatively speaking, non-rotative, and instead of being placed centrally of the wheel proper, is eccentrically and rigidly attached to what I term an internal cam upon or around which the main or supporting wheel which rests upon the track or other foundation revolves. Thus the eccentrically arranged axle is lowered from the customary position and forms part of an independent and relatively non-rotative body concentric to the wheel proper.

It is known that in starting and stopping a car or train equipped with ordinary wheels and axles there is a certain amount of jerk or concussion, but this I avoid by the shifting action consequent upon the relations existing between the rotative wheel proper and the relatively non-rotative internal cam which, though concentric with the wheel proper, has its axle eccentrically fixed with respect to itself, whereby there is a tendency to automatically start or stop the car, train, or other body by the shifting of its own weight according to the pull forward or push backward of the motive power. As a consequence wear and tear are reduced proportionately to the reduction of jerk or concussion, inasmuch as such relative rotative action as exists between the cam and the wheel proper is such as to produce a sensible flexibility. In starting or stopping, say, a car or train equipped with wheels and axles combined in accordance with my invention, the weight of the car or train by the pulling or backing of it is pulled forward or pushed backward of the centers of gravity of the cam and the wheel proper. Furthermore, the power of the brake when used with my invention is increased, for the application of the brake at the back of the wheel will push it forward and throw the weight of the car behind the centers of gravity, thereby automatically checking the speed by the shifting of the load.

While this is a statement of the broad character of my invention, other features of improvement are included therein which, with the advantages attending their use, will be described hereinafter.

In the accompanying drawing: Figure 1 is a side view of my invention. Fig. 2 is a view mainly in vertical section. Fig. 3 is a similar view showing a modified construction.

While the details of construction may be variously modified, I present in the drawing an operative device and modifications thereof, the features of which may be described as follows:

The body of the wheel proper is in two halves 1 and 2, which come together as shown in Fig. 1 at the line $1^a$, the half 1 having tongues 3, 3 which fit in apertures 4, 4 of the half 2. Any other suitable aids to the connection of the two halves of the body may be employed. The tire which is shrunk upon the united halves is indicated by 5.

The cam is shown by 6. In Fig. 2 it is represented at its central part of a width equal to that of the body of the wheel, while the part $6^a$ is of reduced width fitting into a cavity, one half of which is formed in each part of the body, only sufficient clearance necessary for the movement between the cam and wheel body being allowed. Antifriction devices, such as those shown, are preferably interposed. As indicated these consist of a series of rollers 7, the horizontal or peripheral surfaces of which rest between the cam and the wheel body in the annular cavity 8 existing between them. To prevent or lessen lateral friction, each roller is provided at each end with a socket 9 in which is placed a ball 10, the series of balls acting against the respective vertical sides of the annular cavity 8.

In Fig. 3, the cam 6 is shown narrowed toward its connection with the wheel body, and instead of the formation $6^a$ seen in Fig. 2 the corresponding part is rounded, as indicated by $6^c$, resting in a cavity $6^d$ of the wheel body. To lessen friction a section or sections of Babbitt or other antifriction metal $7^a$ are inserted as shown. Oil or other lubricant is admitted to the operative members through ducts suitably placed, and may be supplied in any manner known to the art of lubrication, it being understood that adequate spaces are provided for the purpose.

In Figs. 2 and 3 an annular lip 11 is shown at one side of the device, in which rests a two-part dust or dirt guard 12 having an inturned lip 13. A detachable connection is made between the two parts of the dust guard by means of lapping them and employing bolts as shown. A guard, however, may be used at each side of the wheel. The rotation of the wheel upon the cam resembles that of the free rotation of a wheel on a fixed axis, although the relations between the cam and the wheel proper are such as to allow of the shifting of centers hereinbefore mentioned.

My invention is adapted to all classes of railway rolling stock, and to any mechanical use in which a wheel and axle are required; and when applied to railroad use has an important advantage in that the wheels are independently rotatable, thus greatly reducing the wear and tear of the rails at curves, and also preventing drag of the inside wheel whereby wear on the wheel itself is reduced to a minimum.

While I have shown the cam as of solid structure it may, if desired, for the purpose of lightness, be perforated, ribbed, or otherwise formed.

Reference is hereby made to my copending application Serial No. 585,344, filed Oct. 4, 1910, in which is shown an invention operating upon the same general principle as that of the device herein claimed but embodying differences in structure.

Having thus described my invention, I claim:

1. In a car wheel and axle combined, a wheel proper the body of which is in sections, a central internal cam, the wheel and cam being rotatably fitted together, and an axle rigidly secured to the cam and having its center eccentric to that of the wheel proper, substantially as set forth.

2. In a car wheel and axle combined, a wheel proper the body of which is in sections, an internal one-part cam concentric to said wheel, the wheel and cam being fitted together, and an axle rigidly and eccentrically secured to the cam, substantially as set forth.

3. In a car wheel and axle combined, a wheel proper the body of which is in sections, a tire shrunk on said sections, a central internal cam, the wheel and cam being rotatably fitted together, and an axle rigidly secured to the cam and having its center eccentric to that of the wheel proper, substantially as set forth.

4. In a car wheel and axle combined, a wheel proper the body of which is in sections interfitted together, a central internal cam, the wheel and cam being rotatably fitted together, and an axle rigidly secured to the cam and having its center eccentric to that of the wheel proper, substantially as set forth.

5. In a car wheel and axle combined, a wheel proper the body of which is in sections, a central internal cam, the wheel and cam being rotatably fitted together, antifriction devices being interposed between them, and an axle rigidly secured to the cam and having its center eccentric to that of the wheel proper, substantially as set forth.

6. In a car wheel and axle combined, a wheel proper the body of which is in sections, a central internal cam, the wheel and cam being rotatably fitted together, and antifriction devices interposed between the wheel and cam, said devices consisting of rollers in series and balls also in series, a ball being socketed in each end of each roller, combined with an axle rigidly secured to the cam and having its center eccentric to that of the wheel proper, substantially as set forth.

7. In a car wheel and axle combined, a wheel proper the body of which is in sections, a central internal cam, the wheel and cam being rotatably fitted together, an axle rigidly secured to the cam and having its center eccentric to that of the wheel proper, and a dust or dirt guard consisting of attached but separable members mounted at the side of the cam, substantially as set forth.

8. In a car wheel and axle combined, a wheel proper, consisting of a sectional body and a tire thereon, a central internal cam, the wheel body and cam being rotatively fitted together, and an axle rigidly secured to the cam and having its center eccentric to that of the wheel proper, substantially as set forth.

In testimony whereof I affix my signature in presence of two witnesses.

GEORGE P. EUSTIS.

Witnesses:
 CHARLES LOWELL HOWARD,
 E. G. MARSHALL.

---

Copies of this patent may be obtained for five cents each, by addressing the "Commissioner of Patents, Washington, D. C."